July 23, 1957     D. H. McCONNELL     2,799,944
GAUGING DEVICE

Filed Dec. 3, 1952                           3 Sheets-Sheet 1

INVENTOR.
David H. McConnell
BY Edward J. Noigt
atty.

July 23, 1957 D. H. McCONNELL 2,799,944
GAUGING DEVICE
Filed Dec. 3, 1952 3 Sheets-Sheet 2

INVENTOR.
David H. McConnell
BY Edward J. Noi Jr.
atty.

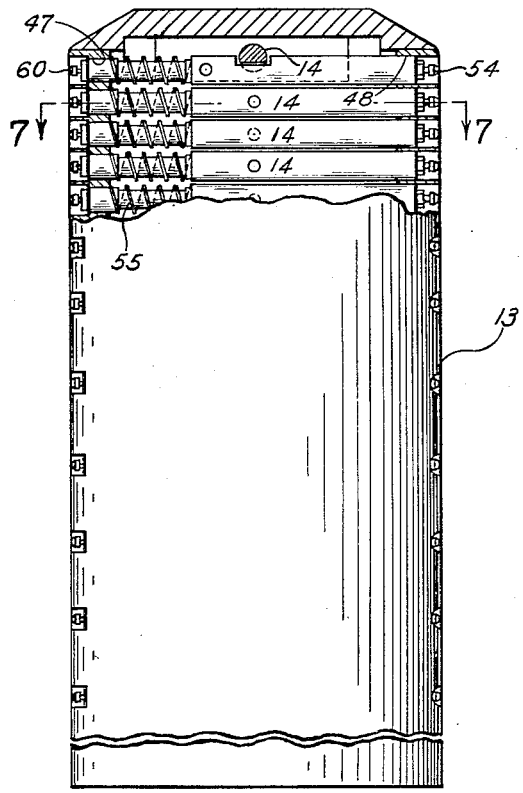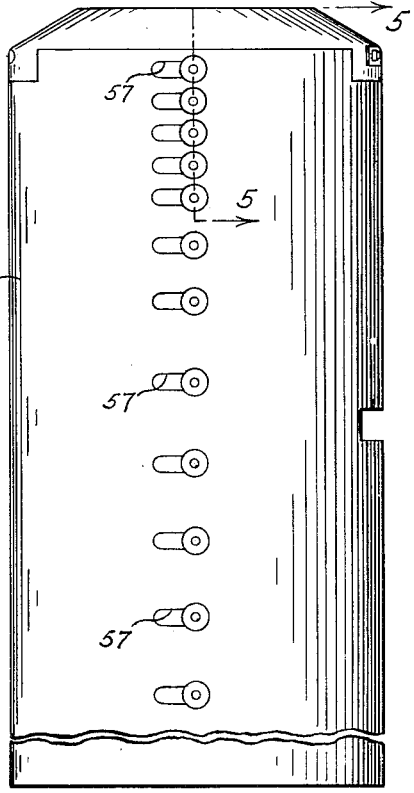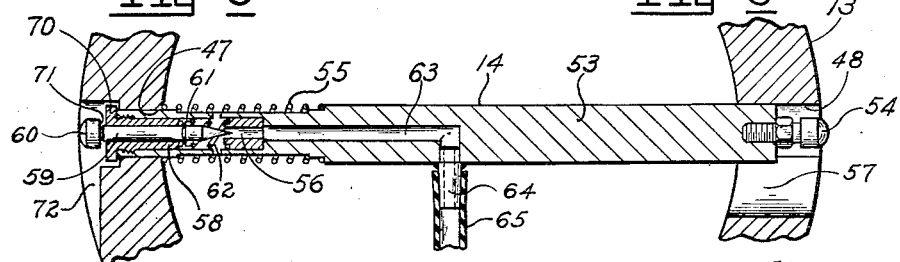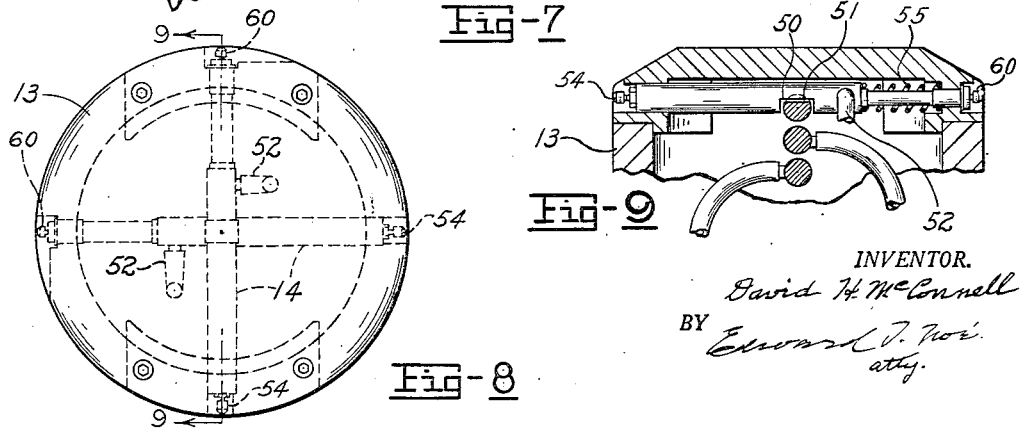

United States Patent Office 2,799,944
Patented July 23, 1957

2,799,944
GAUGING DEVICE

David H. McConnell, Dayton, Ohio, assignor, by mesne assignments, to The Sheffield Corporation, a corporation of Delaware Application December 3, 1952, Serial No. 323,918

3 Claims. (Cl. 33—178)

This invention relates to gauging apparatus.

One object of the invention is the provision of an air leakage type gauge device for measuring the distance between two workpiece surfaces and adapted for use with an air gauge and an air supply, the device having an air leakage opening therein formed between two components of a gauging unit, one of which is slidably mounted in a gauge head or support structure and positioned by one of the surfaces, the other of said components being positioned by the second surface and slidably mounted in the first component, the components constituting a unit floatingly mounted in the head or support structure for location by the surfaces being measured and the leakage through the air leakage opening being controlled by the distance between the workpiece surfaces.

Another object is the provision of a gauging head of the character mentioned having a plurality of leakage controlling gauging units arranged at an angle to one another and closely adjacent and having depressions in their adjacent surfaces whereby they can be mounted in close relationship along the axes of the head and angularly disposed thereabout for sliding movement therein without interference.

Another object is the provision of an apparatus for gauging the interior of a cylinder head or the like and having a spindle, a series of air leakage gauging units arranged along the spindle, a means for locating the cylinder head or the like in generally coaxial relationship to the spindle, and means for projecting the spindle into the cylinder head or the like whereby the floating gauging units measure the interior thereof.

Figure 1:
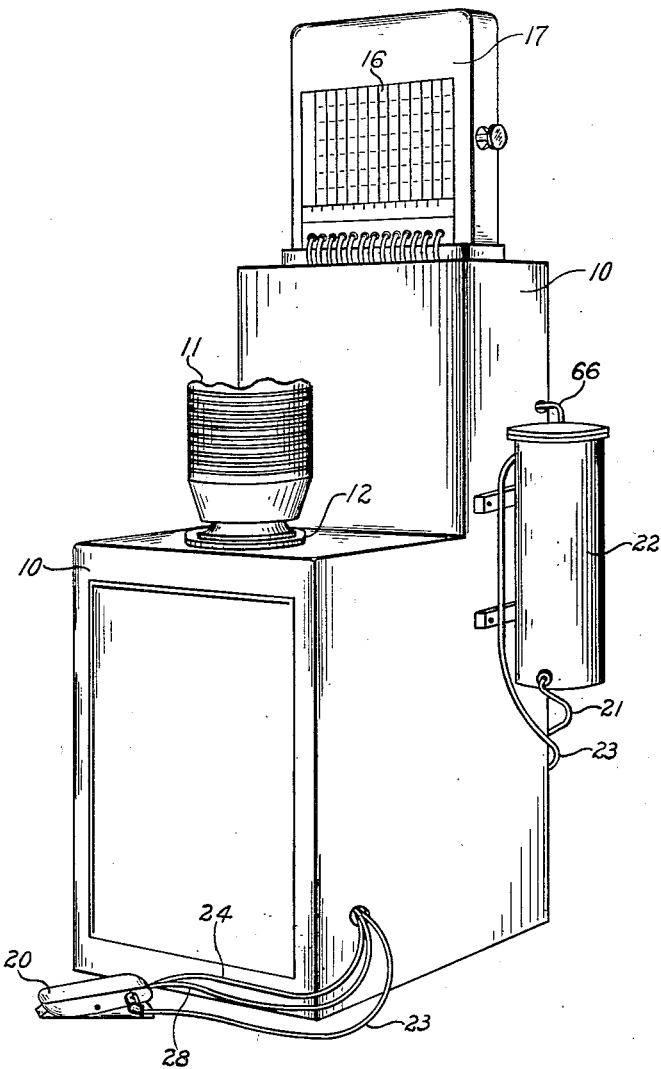
Figure 2:
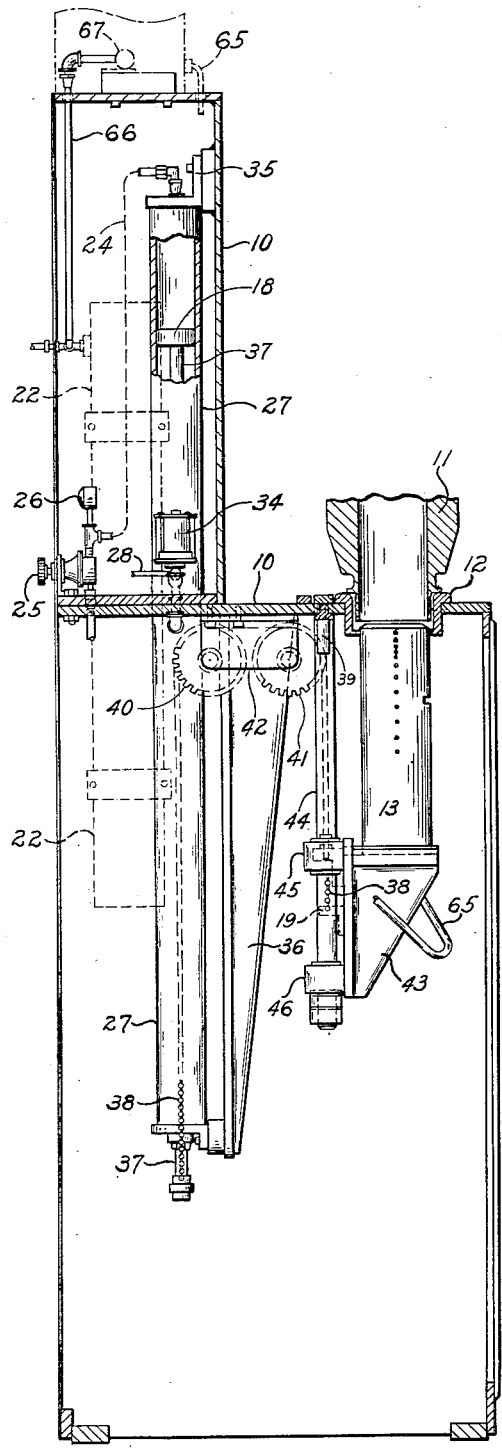
Figure 3:
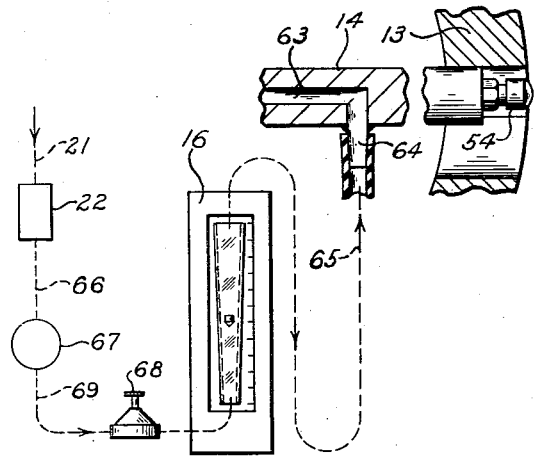
Figure 4:
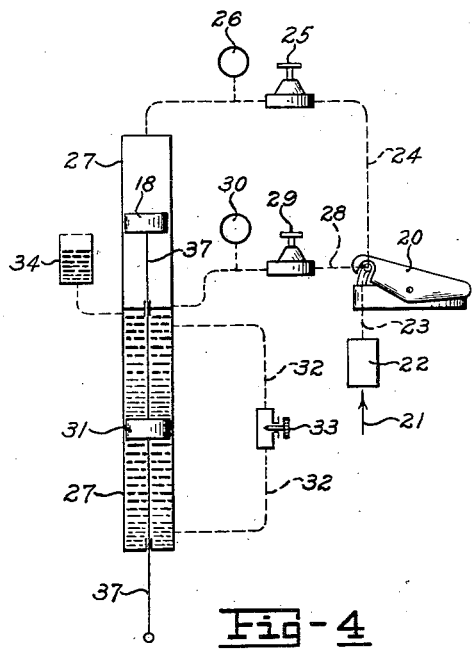

Other objects and advantages of the invention will be apparent from the following description, the appended claims, and the accompanying drawings, in which:

Figure 1 is a perspective view of a gauging apparatus embodying the present invention, Figure 2 is a section view through the gauging apparatus, Figure 3 is a diagrammatic representation of an air circuit to a gauging unit, Figure 4 is a diagrammatic representation of an air circuit and the spindle actuating mechanism associated therewith, Figure 5 is a view in partial section along line 5—5 of Figure 6 of a gaging spindle for use in a gauging apparatus, Figure 6 is a view of one side of a gauging spindle, Figure 7 is a section view along line 7—7 of Figure 5 showing a gauging unit, Figure 8 is a view of the upper end of a gauging spindle, and Figure 9 is a section view along line 9—9 of Figure 8 of the upper end of a gauging spindle taken at right angles to the section of Figure 5.

Referring more particularly to the drawings in which the same reference numerals have been applied to like parts in the several views, 10 designates as an example a gauging apparatus embodying the present invention applied to the measurement of internal diameters in an aircraft cylinder head 11. A spindle 13 carrying a plurality of air leakage gauging units 14 is projected into the cylinder and the corresponding cylinder diameter measurements are individually indicated by gauges in a panel 17.

The gauging apparatus 10 has a locating means 12 on its platform surface for receiving and positioning the lower end of the cylinder head 11 in substantially coaxial relationship to the spindle 13. The spindle 13 which carries the gauging units 14 is mounted vertically in the forward portion of the apparatus, as shown, and is connected for actuation to an air pressure operated piston 18 in a cylinder 27 mounted vertically in the rear portion of the apparatus. The piston 18 is controlled by a foot operated valve 20 positioned for control by the operator. The spindle 13 carries a plurality of air leakage gauging units 14 each of which is connected to an individual air gauge 16 mounted in the panel 17 located on the upper end of the apparatus 10 at approximately the eye level of the operator.

The mechanism for elevating the spindle 13 comprises an air circuit shown diagrammatically in Figure 4. Air under pressure is supplied to a connection 21, passes through an air filter 22, a conduit 23 and to the foot operated valve 20. Movements of the foot operated valve distribute air under pressure to either of control lines 24 or 28. When air is distributed to one of these lines it is returned through the other and exhausted to atmosphere through the foot operated valve 20. Air line 24 leads through a regulator 25, a gauge 26 and to the upper end of the cylinder 27. Air line 28 leads through a corresponding regulator 29, an air gauge 30 and to the lower end of the upper half of the cylinder 27.

The rate of movement of the piston 18 in response to movements of the foot valve 20 is controlled by a hydraulic unit situated in the lower half of the cylinder 27. A piston 31 in this hydraulic unit is fastened coaxially to the air piston 18. Around this hydraulic piston 31 is a conduit 32 having a manually adjustable valve 33 therein for controlling the rate of fluid flow from one side to the other of the hydraulic piston 31. The hydraulic unit is kept filled with liquid by reservoir 34, also shown in Figure 2, leading to the upper end thereof.

The cylinder 27 is shown in Figure 2 mounted in the apparatus 10 by an upper bracket 35 and an extended lower bracket 36. A vertical rod 37 mounted in the cylinder 27 is attached at its upper end to air piston 18, at an intermediate point to a hydraulic piston 31 (see Figure 4) and extends out of the lower end of the cylinder 27. The rod 37 is attached at its lower end to a pair of chains 38 mounted on each side of the air cylinder 27. Each of these chains 38 extends upward over a pair of sprockets 40, 41 and downward therefrom. Each pair of sprockets 40 and 41 is mounted in a bracket 42 fastened to the upper surface of the apparatus platform. At their lower ends chains 38 are connected respectively at 19 to a spindle supporting base 43. There is a pair of vertical guide posts 44 mounted in the apparatus, only one of which appears in Figure 2. The spindle supporting base 43 is guided along these posts 44 by a pair of guide elements 45 and 46 cooperating with each of the vertical posts 44.

A removable dowel 39 projects downward from the apparatus platform and is located for engagement with an upper guide element 45 thus limiting the upward projection of the spindle 13. A dowel 39 is located on each side of the spindle, only one appearing in Figure 2.

In Figures 5 and 6 of the drawings, the upper end of the gauging spindle is shown in more detail illustrating the disposition of the gauging units 14 therein. Each of the gauging units 14 is mounted in the spindle 13 in diametrically situated holes 47 and 48 and is slidable relative thereto. The spacing between the gauging units 14 increases towards the lower end of the spindle 13. In order that measurements of the diameter can be made on lines closely spaced along the axis of the spindle at the upper end thereof, the upper two gauging units are angularly disposed relative to each other about the spindle axis and cutouts have been provided in their adjacent surfaces at 50 and 51. The relationship between these upper two gauging units is more clearly shown in Figures 8 and 9. Because these upper two gauging units intersect at their intermediate points their air supply connections are offset as shown at 52 in Figures 8 and 9.

A detail sectional view of a gauging unit 14 and its association with the spindle walls is shown in Figures 7. A main component 53 of the gauging unit 14 is slidably mounted in the respective spindle walls at 47 and 48 and has an adjustable work contacting projection 54 threaded therein. This component 53 is resiliently biased against the cylinder wall by a spring 55. The component 53 supports a part 56 forming one element of an air leakage orifice. At the end of the component 53 remote from the element 54 a sleeve element 58 is threaded thereinto. Slidably mounted in the sleeve element 58 is a plunger or pin 59 which is pointed at its inner end for cooperation with the element 56 to vary the size of the air leakage orifice as relative displacement occurs. The plunger 59 has a work contacting projection 60 at the outer end thereof. The plunger 59 also has flange like projections 61 adjacent its inner end. Seated between these flange projections 61 and the part 56 in the main component 53 is a spring 62 urging the work contacting projection 60 into contact with a diametrically opposed point in the cylinder wall.

It is thus seen that each of the hole contacting projections 54 and 60 are resiliently urged against diametrically situated points in the cylinder wall and that their contact therewith varies the relative spacing of the element 56 in the component 53 and the pointed inner end of the plunger 59, thereby varying the size of the air leakage orifice in accordance with the internal diameter of the cylinder wall along that diametral line.

A passage 63 in the main component of the valve of the gauging unit 53 communicates through a tenon connection 64 with a tube 65. An individual tube 65 leads from each of these gauging units 14 down through the spindle 14 and up to an air gauge 16. This association is shown in Figure 2 for one unit.

An opening 57 is provided in the spindle wall at one end of each gauging unit 14 to allow insertion of the unit and the projecting tenon connection 64 into the spindle body.

In Figure 3 is shown a diagrammatic representation of one of these air measuring circuits. The air inlet connection 21 and the filter 22 are common to both the measuring circuit and the elevating circuit in the illustrated embodiment. From the filter 22 a conduit 66 leads to a manifold 67. Branching from the manifold 67 an individual tube 69 for each gauge leads to a regulator 68, air then passes through the air gauge 16 and the conduit 65 to one of the gauging units 14.

The individual air circuits to the air gauging units 14 are continuously supplied with air during operation of the apparatus. When the foot operated valve 20 is depressed air is metered to the upper end of the air cylinder 27, lowers the piston 18 and projects the spindle 13 into the cylinder head 11. When the spindle is so located the gauging units 14 being slidably mounted in the spindle with their components resiliently urged against the walls of the cylinder will control the leakage through each of the outlet orifices in the respective gauging units 14 and an indication of the cylinder diameter along that line will be given on the air gauge 16.

Each sleeve element 58 has a flange 70 at its outer end and the work contacting projection 58, on the slidable shaft 59, has a land 71 on its inner face. Space elements can be inserted between the flange 70 and land 71 through a groove 72 in the spindle wall.

It is preferred in the setting up the gauging units to first coordinate the air leakage orifice with the gauge and then to adjust the adjustable work contacting projection 54 while the spindle is situated in a reference part until the gauge reading corresponds to the reference part size which is known. In making this setup the operator inserts, in turn, spacer elements representing the over and under size limits, and differing from each other by the desired tolerance range, between the flange 70 and land 71 of each unit, pushes the projection 58 in until it contacts the spacer and adjusts the corresponding gauge 16 until it indicates the over and under size limits when the respective spacers are so located. The reference part is then placed and the work contacting projection 54 is adjusted as mentioned above. This procedure is followed in setting up each of the gauging units 14.

Thus it is seen that a gauging apparatus is provided having a plurality of floatingly mounted gauging units which can be easily calibrated. Means are further provided for locating the gauging units in extremely close axial displacement along their supporting means for measurement of close diameters.

While the form of apparatus herein described constitutes the preferred embodiment of the invention, it is to be understood that the invention is not to be limited to this precise form of apparatus, and that changes may be made therein without departing from the scope of the invention as defined in the appended claims.

I claim:

1. A gauging head for insertion into a hole to be measured having an elongated member slidably carried therein for longitudinal movement along a diameter of the hole to be measured a work contactor adjustably fixed at one end of said member, resilient means between the head and member biasing the work contactor in one direction for engagement with a hole wall, limit means cooperating between said head and said member limiting movement of the member in said one direction, a work contacting element for engagement with the opposite side of the hole wall carried by said member for movement along the axis thereof, resilient means between the member and the work contacting element biasing said element in the other direction relative to the member for engagement with the opposite side of a hole wall, limit means cooperating between said member and said element limiting movement of the element relative to the head in said other direction, cooperating means on said member and work contacting element providing an adjustable orifice, and passage means for connecting the adjustable orifice to a gauge means and to a source of air under pressure.

2. A gauging head for insertion into a hole to be measured having an elongated member slidably carried therein for longitudinal movement along a diameter of the hole to be measured, said member having a work contactor adjustably fixed at one end thereof for engagement with the hole wall, whereby the effective length of the member can be adjusted, a work contacting element for engagement with the opposite side of the hole wall carried coaxially within said member for sliding movement along the axis thereof, resilient means in said head operative upon said member and work contacting element biasing said work contactor and contacting element into engagement with opposite sides of the hole wall, limit means cooperating between said member and said element for maintaining the element within the member, cooperating means on said member and work contacting element providing an adjustable orifice, passage means for connecting the adjustable orifice to a gauge means and to a source of air under pressure, said member and work contacting element having cooperating setting portions normally spaced apart and adapted to be arranged precisely at different predetermined relative positions by interposing spacers during set-up operation.

3. A gauging head for dimension measurements comprising a gauging head body, an elongated gauging member extending substantially to each side of said body and slidably carried therein for longitudinal floating movement, a contactor fixed at one end of said member projecting beyond said body for engagement with the work during gauging, a spring about said member cooperating between said member and said body to urge said member in the direction of said work contactor, projecting stop means on said member and cooperating means on said body limiting movement of the member in said direction, a plunger carried coaxially in said member at the other end thereof for sliding movement along the member axis, means in said member providing an air leakage orifice, said plunger having work engaging means at the outer end thereof and an orifice controlling surface adjacent its inner end for movement toward and from said orifice to control leakage therethrough, spring means in said member cooperating between the member and plunger urging said plunger and work contacting means in one direction out of the member, limit means cooperating between said member and said plunger maintaining the plunger within the body, passage means in said member in communication with said orifice and opening laterially of said member, and flexible conduit means connected to said opening adapted for connection to a source of air under pressure and an air gauge, and maintaining communication during longitudinal floating of the member in the body.

References Cited in the file of this patent

UNITED STATES PATENTS

| 1,860,640 | Witchger | May 31, 1932 |
| 1,894,025 | Dennison | Jan. 10, 1933 |
| 2,150,070 | Kregecz | Mar. 7, 1939 |
| 2,346,406 | Wright | Apr. 11, 1944 |
| 2,375,600 | Wattebot | May 8, 1945 |
| 2,571,161 | Poole | Oct. 16, 1951 |
| 2,616,068 | McDonald | Oct. 28, 1952 |
| 2,622,331 | Haines | Dec. 23, 1952 |
| 2,623,294 | Fox | Dec. 30, 1952 |
| 2,680,912 | Wylie | June 15, 1954 |
| 2,691,827 | Aller | Oct. 19, 1954 |

FOREIGN PATENTS

| 118,948 | Australia | Sept. 28, 1944 |